Feb. 19, 1952  L. FREIMARK  2,586,639
CENTERING GAUGE
Filed Sept. 2, 1947  3 Sheets-Sheet 1
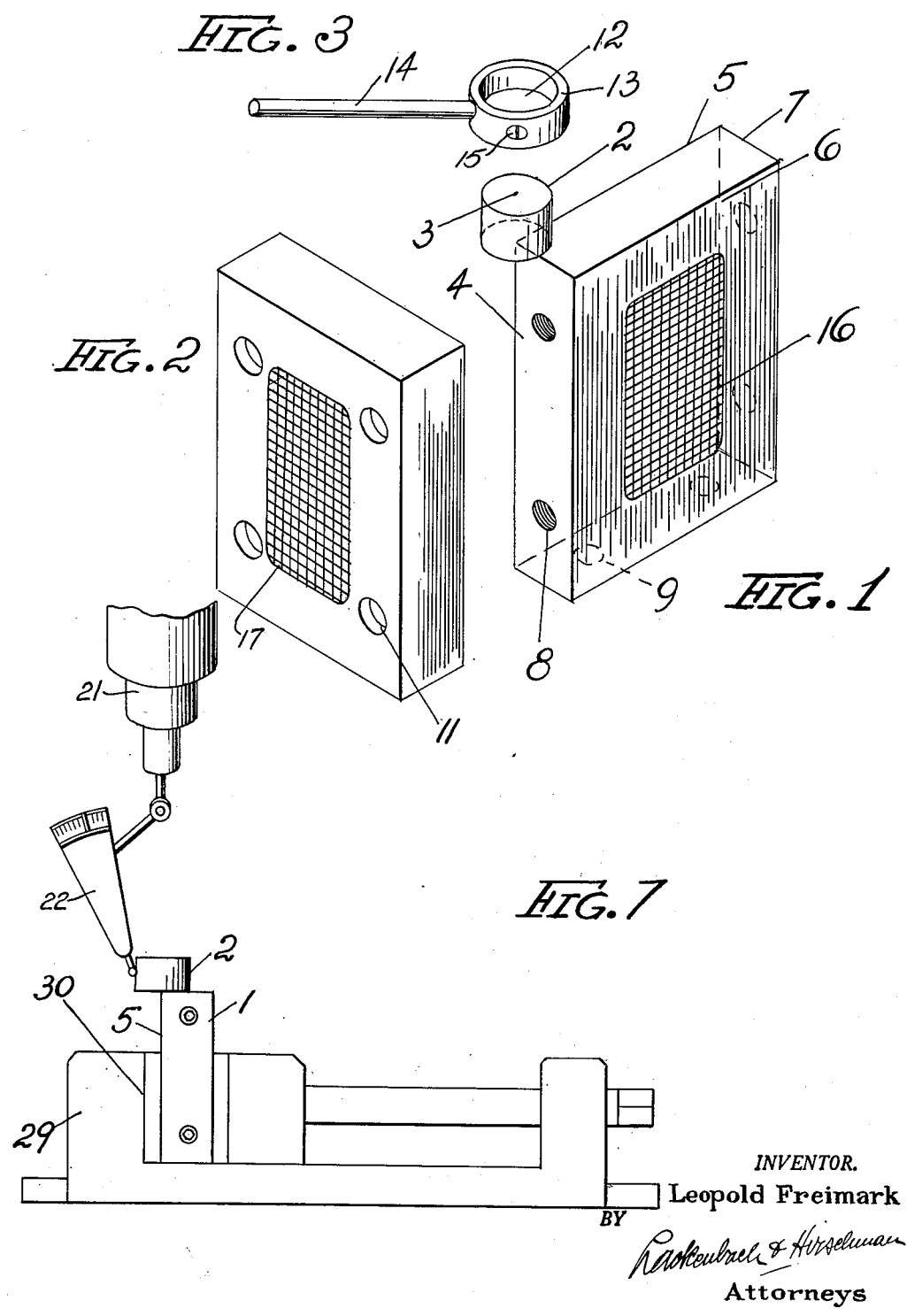
INVENTOR.
Leopold Freimark
BY
Rackenbach & Hirselman
Attorneys

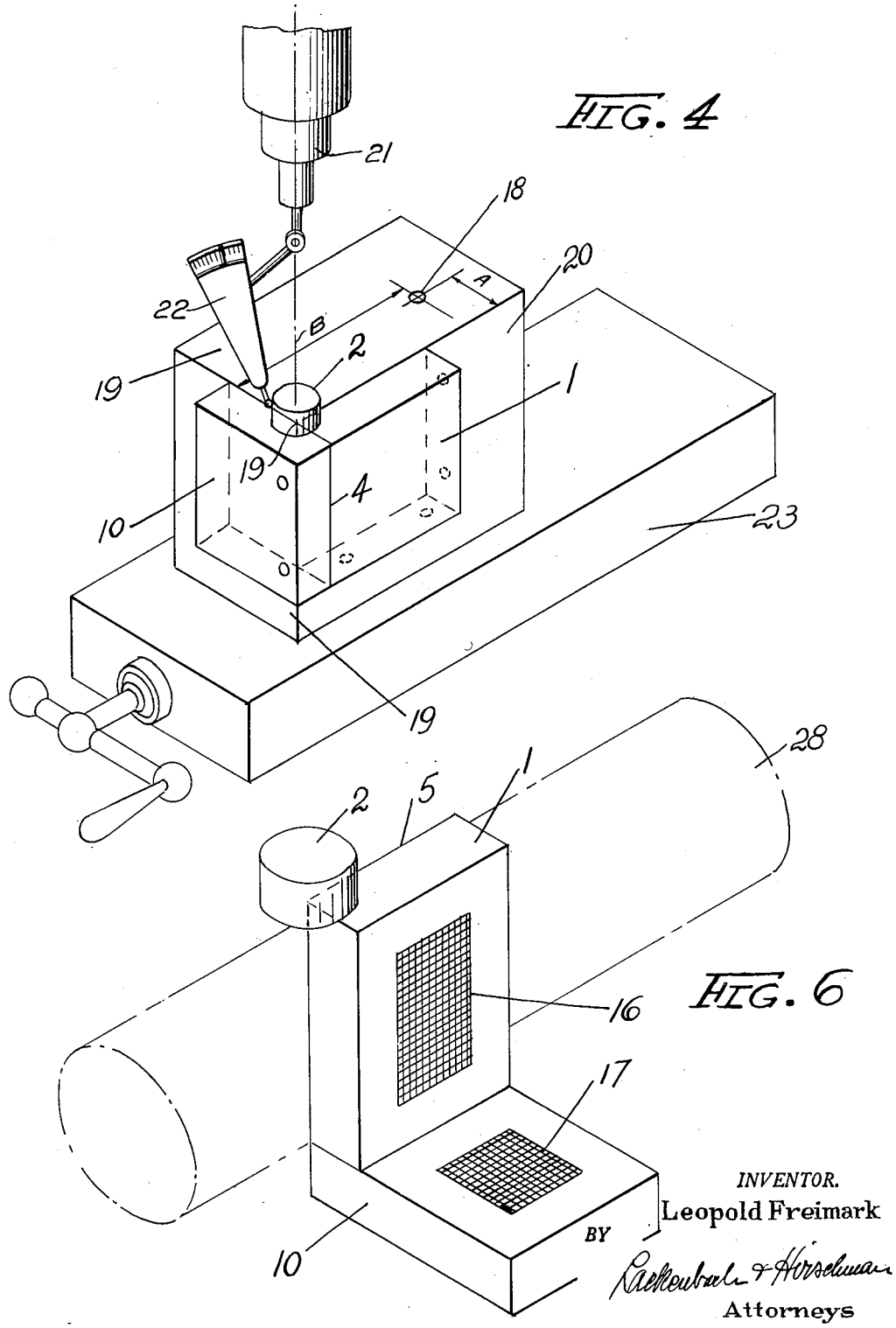

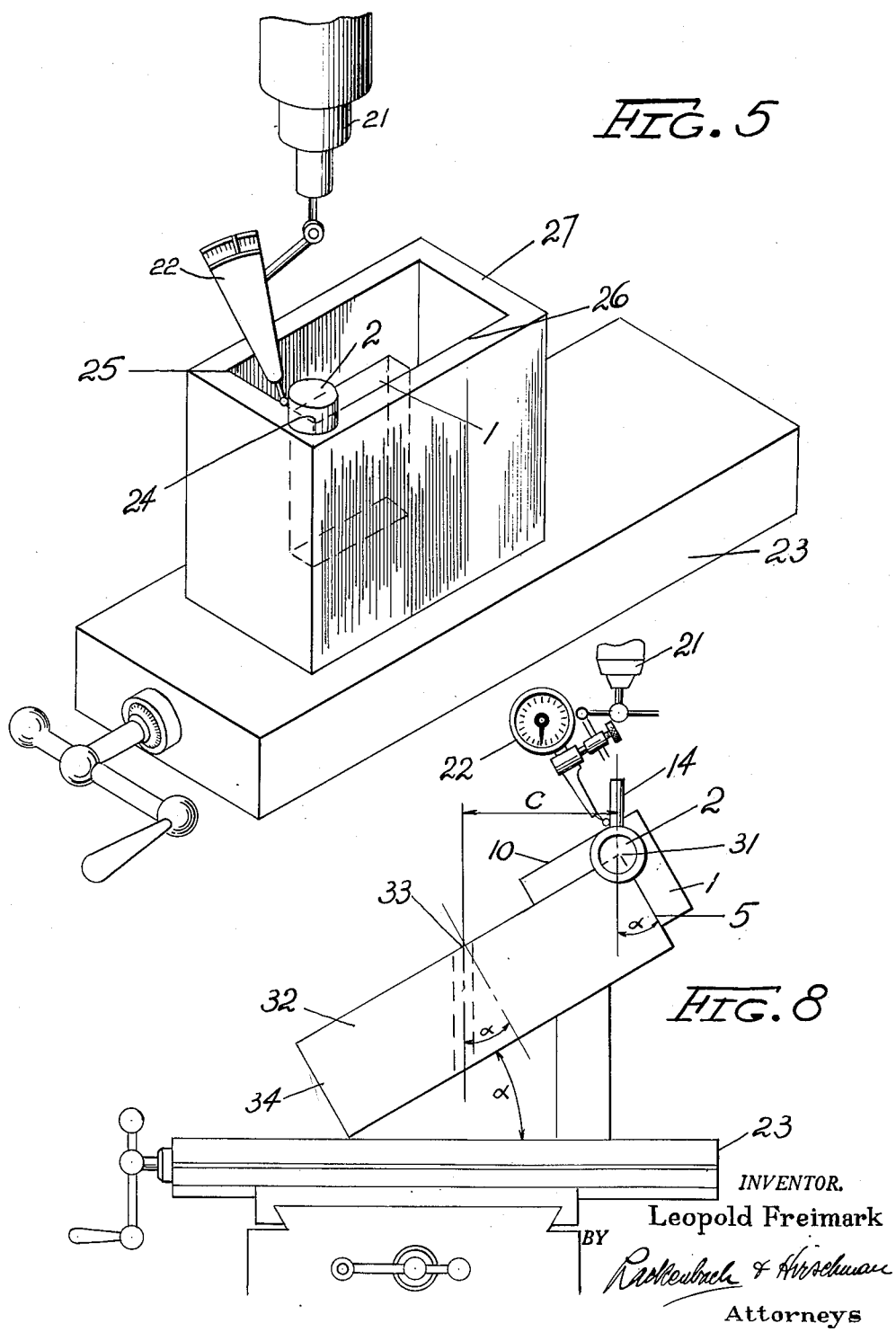

Patented Feb. 19, 1952

2,586,639

UNITED STATES PATENT OFFICE 2,586,639

CENTERING GAUGE

Leopold Freimark, New York, N. Y.

Application September 2, 1947, Serial No. 771,710

5 Claims. (Cl. 33—174)

1

The invention relates to a machine tool or device for setting, locating and centering a workpiece on a machine table in certain dimensional relationship to the axis of its rotating working-spindle.

My tool or device functions, in addition, as a gauge for checking the accuracy of machining operations in relation to either the centers of holes or in relation to center lines or faces of a workpiece from which the dimensions to be followed in machining the workpiece are given.

The location of holes in workpieces to be machined on jig-borers, jig-grinders, milling machines or other machine tools is usually determined by dimensions given from two adjacent sides of the workpiece.

These two sides, also called faces, or more accurately, their intersection, must be aligned with the centerline of the rotating machine-spindle to meet accurate and precise machining specifications; only after this alignment has been done, can the machine table be moved to the desired position in order to start the required machining operation.

While devices known and used for alignment of corners and faces of workpieces permit the locating of one face of the workpiece at a time, the setting and locating tool made in accordance with my invention is designed for the most accurate alignment of corners formed by the intersection of any two sides of a workpiece or for the alignment of flat or curved surfaces or faces of a workpiece. My setting tool is therefore an excellent device for locating and for checking the alignment of jigs, holding fixtures, and vises in relation to the axis of the machine-spindle of a machine tool.

By adding a simple attachment, my novel tool can further be used for the positioning of centers for angular holes.

The invention provides further a means for checking machined surfaces of workpieces in relation to finished holes or of machined holes in relation to previously finished surfaces of workpieces without taking the workpiece off the machine table.

Specific objects of the invention will appear from the description hereinafter and the features of novelty will be pointed out in the claims.

In the accompanying drawing, illustrating various embodiments and means of utilizing my invention, Fig. 1 is a perspective view of the centering tool; Fig. 2 is a perspective view of a side-plate or bottom-plate which is an attachment to the centering tool; Fig. 3 is a perspective view of

2 another attachment to the centering device for locating and checking centers of angular holes; Fig. 4 is a perspective view of the centering tool used in locating, setting and centering one outside corner of a workpiece; Fig. 5 is a perspective view of the centering tool used in the inside corner of a workpiece; Fig. 6 is a perspective view of the centering tool used for the alignment of a cylindrical workpiece; Fig. 7 is a side view of the tool in use for the alignment of vise-jaws; and Fig. 8 is an end view of the centering device and its attachment, as shown in Fig. 3, for angular settings for the purpose of boring angular holes.

The main element of my novel centering device is a cylindrical or any symmetrical geometric body 2 whose axis 3 is located either exactly in the intersection of two sides 4 and 5 or at a given and known distance from the intersection of the two sides 4 and 6, or of the two sides 5 and 7 or of the two sides 6 and 7 of a flat gauge-block 1 which is formed either integrally with the body 2 or is in any suitable manner connected with the body 2. The thickness and the width of the gauge-block are preferably of standard dimensions.

The flat gauge-block 1 has a plurality of holes 8 and 9 which may be threaded and which are scattered at regular intervals in the sides, especially the smaller sides of gauge block 1, so that a side or bottom plate 10, with corresponding holes 11, may be attached to the main body 1 by screws or dowels as shown in Fig. 4, Fig. 6 and Fig. 8 or in any other way suitable to perform the locating or checking operation as required.

The attachment to the centering gauge is used for locating and checking angular holes in workpieces (shown in Fig. 3 and Fig. 8).

The attachment shown in Fig. 3 consists of a cylindrical ring 13 and a cylindrical pin 14 attached to ring 13 perfectly square to it and in line with the center of ring hole 12.

In the utilization of the attachment, as shown in Fig. 3, the ring 13 fits over the cylinder 2 of the main gauge and is kept in the desired position by a set screw 15.

In the gauge block 1, as well as in the side plate 10, openings 16 and 17, respectively, are provided, into which powerful magnets are positioned for the purpose of holding the centering gauge in a sure and quick manner to the workpiece, provided, of course, that the workpiece itself is magnetic, and reacts to magnetism.

In Figs. 4 to 8, inclusive, there are illustrated various ways in which the device of my invention may be used.

In Fig. 4, for instance, the alignment of a hole 18 to be drilled or bored in the work piece 19 in relation to corner 20 is demonstrated. The location of the hole 18 from corner 20 is given by the dimensions A and B. The centering gauge, with plate 10 attached to side 4 of the gauge block 1, is held to this corner 20. The machine-spindle 21, with an indicator 22 inserted in it, is rotated around cylinder 2 of the gauge and the machine table 23, with the work 19 being moved lengthwise or crosswise in known manner, until the indicator 22 shows the same reading all around the circumference of the cylinder 2. The corner 20 is thus perfectly in line with the axis of rotation of the machine spindle. Now the table 23, which carries the work 19, is moved the distance B lengthwise and the distance A crosswise thereby setting the centerline of the machine-spindle in exact line with center of the hole 18 to be drilled or bored.

In addition, the centering tool may be used for checking the accuracy of dimensions A and B after the hole has been drilled or bored.

In Fig. 5, the centering gauge of my invention is used for the location of a corner 24 formed by the intersection of the two inner faces 25 and 26 of a workpiece 27. The gauge block 1 is attached to the inside corner 24 as shown. Now cylinder 2 of the centering tool has only to be utilized as previously described, in order to align the machine-spindle axis 21 with the corner 24.

The centering device with its plate 10 screwed as a base to the bottom of gauge block 1, as shown in Fig. 6, is used for the location of centers for holes or centerlines for slots or keyways in relation to the centerline, or in relation to the line of tangents, of a cylinder 28 or in relation to a point or a line of a workpiece with any geometrically curved surface. In the utilization of my device for this purpose, the side 5 of the gauge block 1 is placed parallel to the centerline of the cylindrical work 28 against the work. Cylinder 2 of the gauge is again utilized in the foregoing described manner and thereby the axis of rotation of the machine-spindle is perfectly aligned by the contactline of the gauge with the workpiece 28. In order to align the axis of the cylindrical workpiece 28 with the machine-spindle-center 21, the table carrying piece 28 (the table is not shown in Fig. 6) is moved half the diameter of the cylinder away from the spindle-axis in the direction of the centering gauge. Any other hole position on said cylindrical work may be found in like manner.

Fig. 7 illustrates the use of my centering tool for the alignment of vise-jaws in relation to the axis of rotation of a machine-spindle 21. The gauge is placed in any suitable manner in the vise 29, preferably with side 5 of the gauge block contacting the fixed jaw 30 of the vise. Cylinder 2 of the gauge is now centered with the centerline of the machine-spindle 21 in the manner heretofore described. Thus, the face of fixed jaw 30 is likewise positioned in the axis of the working-spindle 21. After removing the centering gauge from the vise, the workpiece is placed in vise 29 and machining operations with dimensions given from the face joining the fixed jaw of the vise can be performed with highest accuracy.

Fig. 8 shows the centering tool adapted for locating angular holes. The plate 10 is screwed to the side of gauge block 1 as shown and the special attachment of Fig. 3 is mounted on cylinder 2 of the centering gauge. If now, for instance, a hole 33 is to be bored in the workpiece 32 under an angle alpha to the side 34 and the center of hole 33 is given by the distance C from corner 31, the workpiece 32 is laid on the machine table 23 under the angle "alpha" and in the usual manner clamped to the table. The centerline of pin 14 of the attachment Fig. 3 is set in the given angle alpha to the side 5 of the gauge block 1 in known manner either by a sinebar, by a protractor, or by other known means, and then kept in position by the setscrew 15 (Fig. 3).

The gauge, thus made ready for this particular use, is held to corner 31 either by its own weight or by the magnetic inserts 16 and 17 (Fig. 1 and Fig. 2). Pin 14 and therefore corner 31 is located in the axis of the machine-spindle 21 in the manner described heretofore, the table 23 moved lengthwise the distance C and thereby the centerline for the angular hole 33 is brought in line with the machine-spindle-center.

As will be seen from the above description, the centering device of my invention is a simple but accurate device for locating a side or the intersection of two sides in relation to the axis of rotation of any working spindle. The centering tool may be used also for the positioning of holes in cylinders or in bodies whose outside is formed by any kind of geometric curved surfaces. Furthermore, the invention may be adapted to locate angular holes in workpieces by adding a simple attachment to the centering device.

In addition, my centering tool may be used for checking finished machining operations in relation to some previously finished face or intersection of faces or for checking machined sides in relation to previously machined holes or slots.

I claim:

1. A centering and checking tool comprising a gauge block and a cylindrical geometric body secured to the gauge block, with the axis of said body in line with the line of intersection of two adjacent lines of said gauge block, a plate in juxtaposition with said gauge block, and in which the gauge block is provided with a plurality of threaded apertures by means of which said plate, having corresponding apertures therein, may be secured to said gauge block in different positions whereby said plate aids in properly positioning said gauge block.

2. A centering device in the form of a gauge block the body of which comprises an exact right parallelepiped having true planar faces joined to a right cylinder, the axis of said cylinder being a linear continuation of one edge of said parallelepiped.

3. A centering device comprising two rectangular gauge blocks of like height connected together so as to form an internal right angle and another cylindrical gauge block secured to one of said firstnamed gauge blocks and so disposed that its axis is a linear continuation of the intersection of the surfaces of said firstnamed gauge blocks enclosing said angle.

4. The centering device of claim 3, including an attachment for use in securing oblique angular settings, said attachment comprising a ring having a radial cylinder extending outward therefrom, said ring being adapted to be fitted over said cylindrical gauge block.

5. A centering device comprising a first gauge block the body of which is a right parallelepiped joined to a right cylinder, the axis of said cylinder being a linear continuation of one edge of said parallelepiped, and a second gauge block the body of which is a right parallelepiped, both gauge blocks being provided with matching apertures whereby the second block may be secured to the parallelepipedonal portion of the first to form an internal right angle the apex of which is in line with said axis.

LEOPOLD FREIMARK.

REFERENCES CITED

The following references are of record in the file of this patent:

UNITED STATES PATENTS

| Number | Name | Date |
|---|---|---|
| 1,330,069 | Fischacher | Feb. 10, 1920 |
| 1,408,098 | Knapp | Feb. 18, 1922 |
| 1,778,481 | Boucher | Oct. 14, 1930 |
| 1,997,639 | Hetherington | Apr. 16, 1935 |
| 2,005,870 | Miller | June 25, 1935 |
| 2,197,505 | Mosher | Apr. 16, 1940 |
| 2,201,454 | Reich | May 21, 1940 |
| 2,384,058 | Whitmore | Sept. 4, 1945 |
| 2,417,150 | Berry | Mar. 11, 1947 |
| 2,417,234 | Calow | Mar. 11, 1947 |
| 2,435,799 | Rizor | Feb. 10, 1948 |

OTHER REFERENCES

American Machinist, Dec. 9, 1943, page 103.